March 23, 1943.  A. F. TOELKE ET AL  2,314,434

PACKAGING APPARATUS

Filed May 17, 1941    7 Sheets-Sheet 1

August F. Toelke,
Reynold Gehne,
Peter J. Wenta,
Inventors.
Haynes and Koenig,
Attorneys.

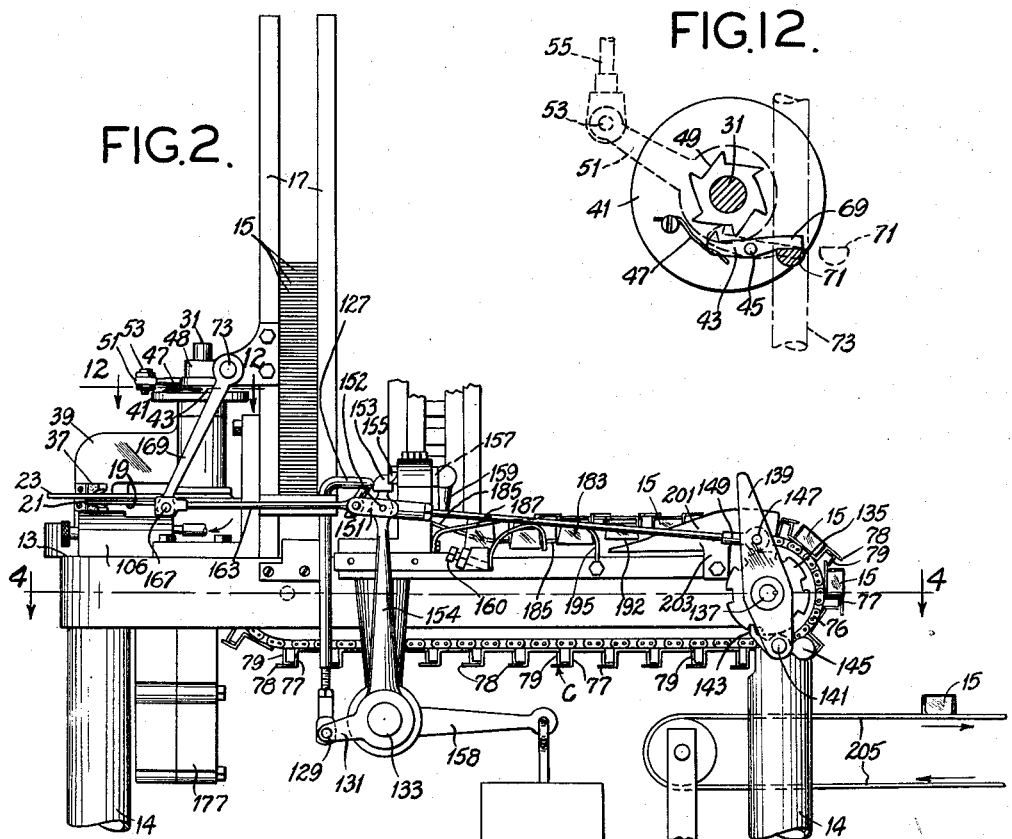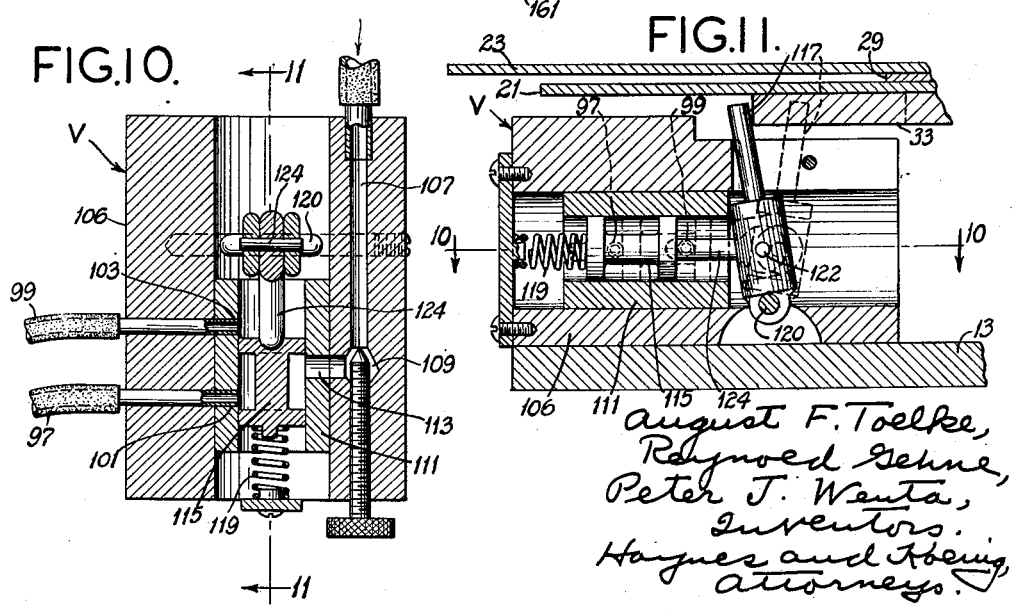

March 23, 1943.  A. F. TOELKE ET AL  2,314,434

PACKAGING APPARATUS

Filed May 17, 1941  7 Sheets-Sheet 3

August F. Toelke,
Reynold Gehne,
Peter J. Wenta,
Inventors.
Haynes and Koenig,
Attorneys.

March 23, 1943. A. F. TOELKE ET AL 2,314,434

PACKAGING APPARATUS

Filed May 17, 1941 7 Sheets-Sheet 4

August F. Toelke,
Reynold Gehne,
Peter J. Wenta,
Inventors.
Haynes and Koenig
Attorneys.

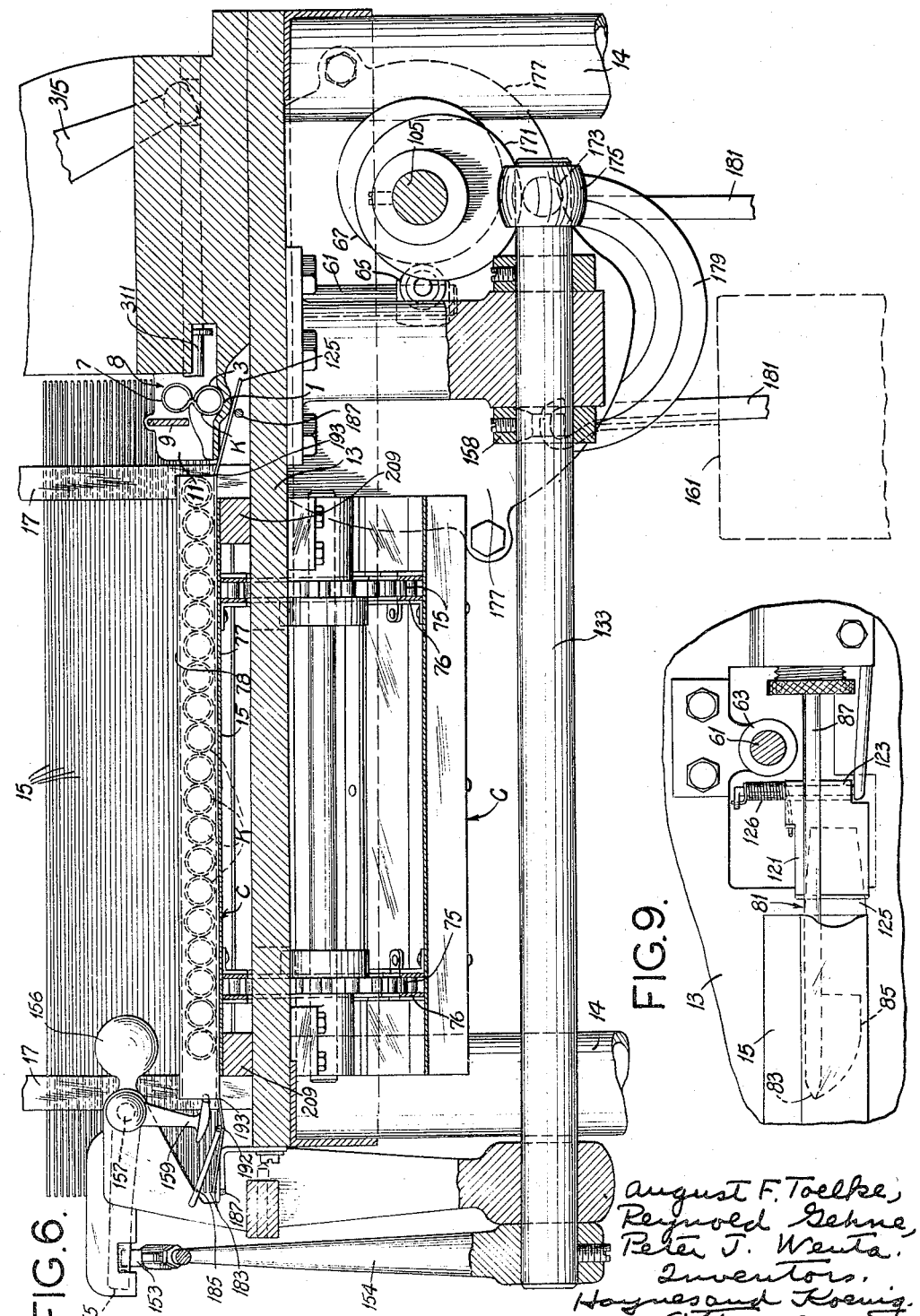

March 23, 1943.  A. F. TOELKE ET AL  2,314,434
PACKAGING APPARATUS
Filed May 17, 1941  7 Sheets-Sheet 7
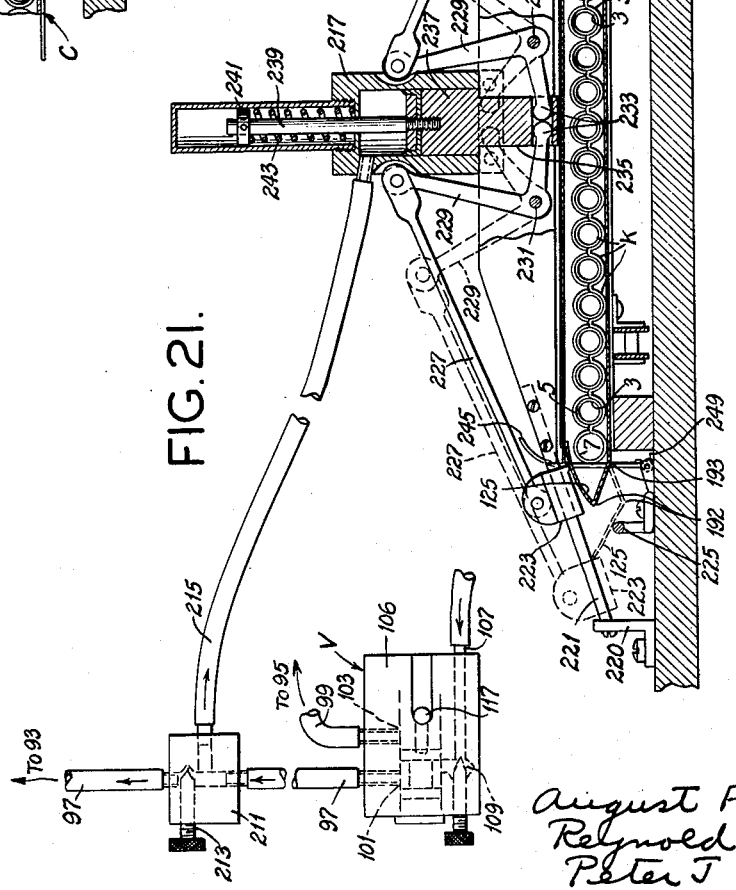
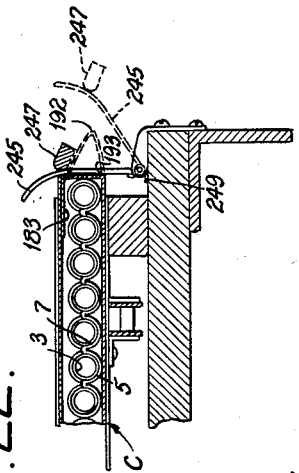
FIG. 22.
FIG. 21.
August F. Toelke,
Reynold Gehne,
Peter J. Wenta,
Inventors.
Haynes and Koenig
Attorneys.

Patented Mar. 23, 1943

2,314,434

UNITED STATES PATENT OFFICE 2,314,434

PACKAGING APPARATUS

August F. Toelke, Velda Village, Reynold Gehne, Pine Lawn, and Peter J. Wenta, Brentwood, Mo., assignors to Jackes-Evans Manufacturing Company, St. Louis, Mo., a corporation of Missouri Application May 17, 1941, Serial No. 394,038

13 Claims. (Cl. 93—3)

This invention relates to packaging apparatus, and with regard to certain more specific features, to an automatic loader for packaging cartridge clips of the type referred to in the United States patent of August F. Toelke et al., No. 2,283,885, dated May 19, 1942, for Testing gauge.

Among the several objects of the invention may be noted the provision of apparatus for application to said testing gauge whereby the cartridge clips may be automatically packaged after test; and the provision of apparatus of the class described which is compact and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings in which are shown several of various possible embodiments of the invention, Fig. 1 is a plan view of parts without a showing of the testing gauge of said patent;

Fig. 2 is a front elevation of Fig. 1;

Fig. 6 is a vertical section taken on line 6—6 of Fig. 1;

Fig. 9 is a fragmentary plan view of a part of Fig. 8;

Fig. 10 is a horizontal section taken on lines 10—10 of Figs. 3 and 11, showing certain valve details;

Fig. 11 is a vertical section taken on line 11—11 of Fig. 10;

Fig. 12 is a horizontal section taken on line 12—12 of Fig. 2;

Fig. 21 is a vertical section taken on line 21—21 of Fig. 20, showing said modification; and, Fig. 22 is a vertical section taken on line 22—22 of Fig. 20.

Similar reference characters indicate corresponding parts throughout the several views of the drawings.

The apparatus of the present invention may be built into the testing apparatus disclosed in said patent above mentioned, or into similar apparatus which feeds out interfitting or adjacent finished clips in a series. Each clip will be indicated by the letter K and is provided on one side with end bands 3 and 5, and has an opposite intermediate band 7. In side elevation, each clip has the appearance of a numeral eight, bands 3 and 5 forming one loop in elevation and band 7 forming the other. The distance between the inner edges of the spaced bands 3 and 5 is such as to receive the interfitting band 7 as the clips are pushed from the testing parts described in said patent. It is to package the clips thus serially interfitted that is the purpose of the present invention.

Figure 1:
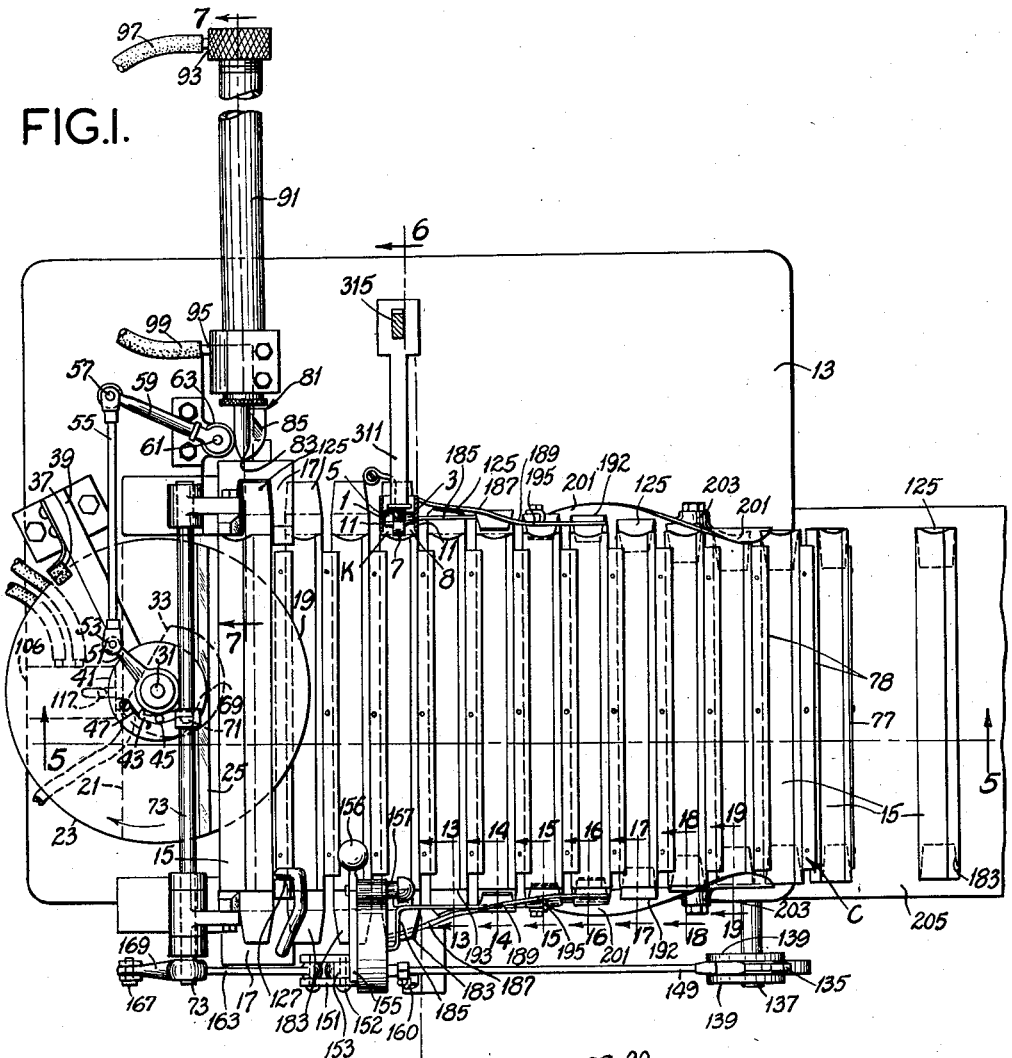

Referring now more particularly to Figs. 1 and 2, there is shown at numeral 13 a platform supported upon legs 14. The testing apparatus above the platform 13 has not been repeated in the drawings herein, being shown in said patent, and it will suffice to state that it deposits clips successively in the vertical position shown at K in Fig. 1.

At numeral 105 is shown the cam-shaft which, through means already described in said patent, or similar means, is responsible for the rocking of an arm 315. This arm, through its oscillations, reciprocates a pusher 311. The cam-shaft is driven by a belt 181 through a gear reduction box 177. As will be seen from Fig. 6, clips K which come from the testing apparatus descend at 8, with the loops 3 and 5 positioned in a socket 1 behind a flap 9, and between guides 11. Upon reciprocation of the pusher 311, the clips are rotated counterclockwise into horizontal positions and pushed to the left (Fig. 6), successive central loops 7 being in advance and taking up positions between successive trailing loops 3 and 5. It is an object to push the resulting column of interlocked clips into a cardboard package which is brought into a stationary position directly opposite the reciprocating ram 311.

Figure 5:
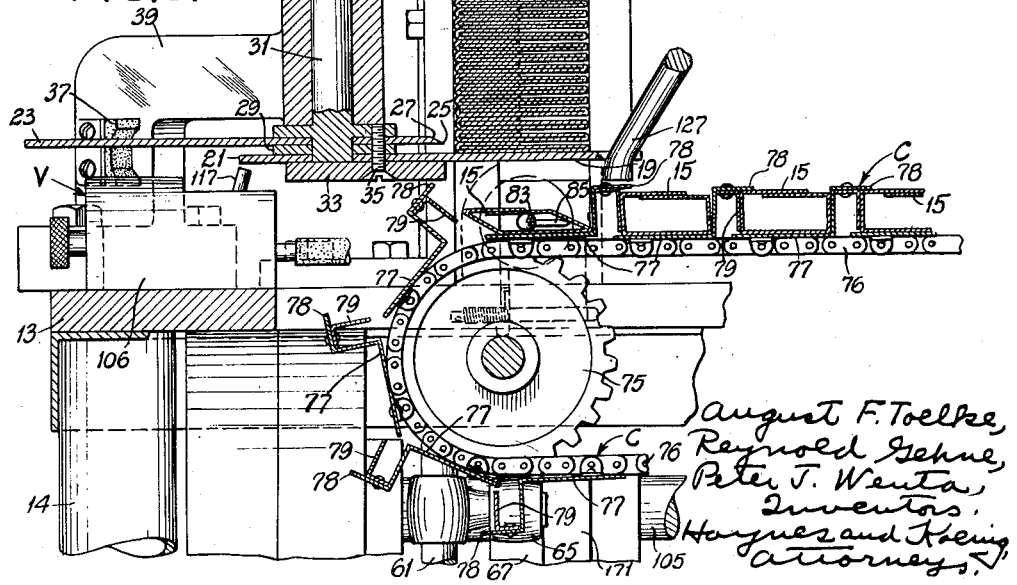
Fig. 5 is a vertical section taken on line 5—5 of Fig. 1.

Cartons 15 which form the boxes are received in a flat condition, as shown in Figs. 2, 5 and 6. A supply of them is placed between vertical guides 17, the bottommost one of cartons 15 being supported upon a lower partially circular plate 19, which is cut away as shown at 21. This plate when in the angular position shown in Figs. 1 and 5 supports the column of flat packages, but if rotated 180°, it will drop the bottommost flat package.

In order to prevent dropping more than one package at a time, a second, upper, partially circular plate 23 is provided with a cut-away portion 25. The edge 27 at the cut-away portion is more or less sharpened, so that upon rotation, it may become inserted above the lowermost carton and below the next higher carton. The plate 23 is spaced from the plate 19 by washer 29 to effect this purpose. The plates 23 and 19 and the washer 29 are held together on the end of a shaft 31 by means of a cam 33 which in turn is held in place by a clamping screw 35.

Thus if the shaft 31 is rotated, the edge 27 is inserted above the lowermost carton to hold the second-lowermost carton upon the upper plate 23 before the lower plate 19 turns from beneath the lowermost carton 15. Hence, as the lower plate 19 moves to the 180° position with respect to Figs. 1 and 5, the lowermost carton is dropped when the cut-away portion 21 comes around beneath the column of cartons 15. Later in the cycle the space 25 associated with upper plate 23 drops the next (now lowermost) carton upon the lower plate 19. Thus one lowermost carton is dropped for each revolution of the shaft 31. A friction brake 37 operative upon one or the other edges of the plates 19 and 23 serves to maintain given positions of these plates when they are not activated.

The shaft 31 is carried in a bracket 39 and has fast on its upper end a disc 41. A pawl 43 is pivoted at 45 on the upper surface of the disc 41 and is normally biased clockwise (Fig. 12) by means of a spring 47, also carried upon the disc 41.

Figure 3:
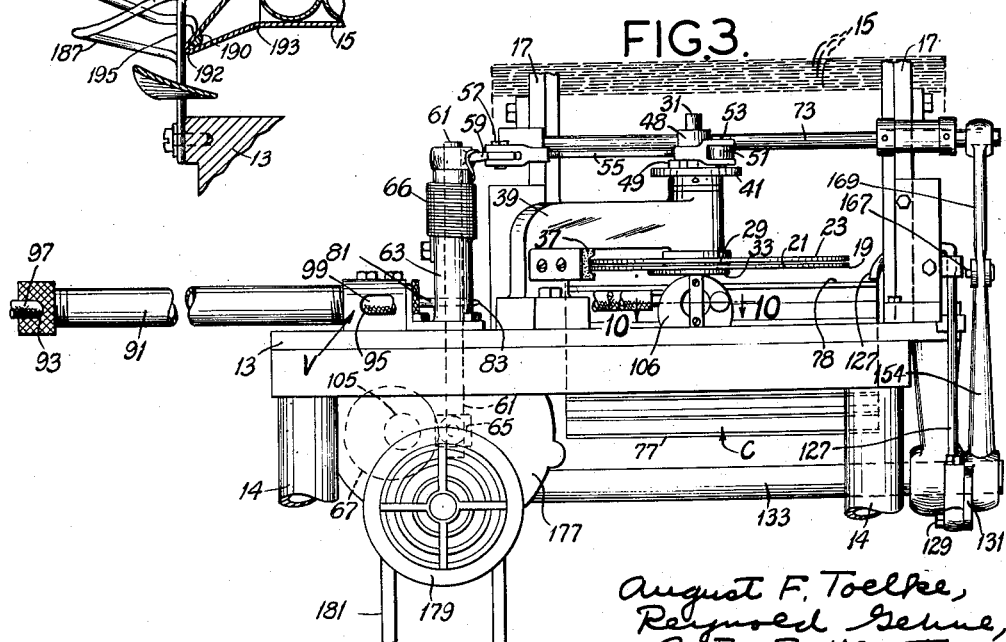
Fig. 3 is a left-end elevation of Fig. 1.
Figure 4:
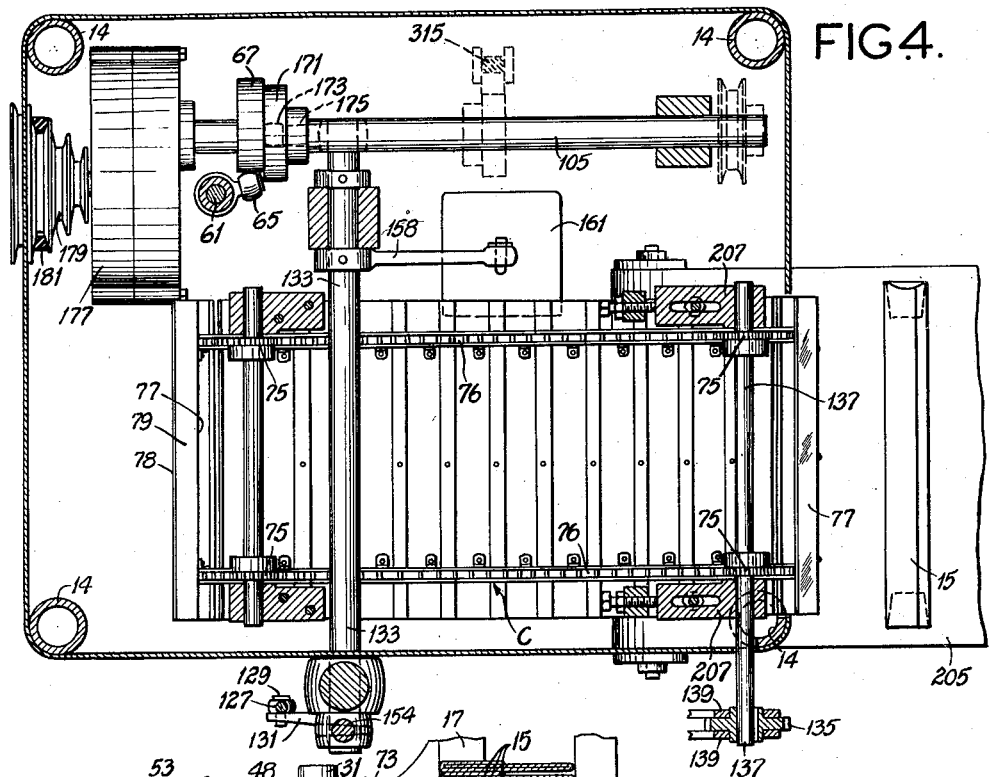
Fig. 4 is a horizontal section taken on line 4—4 of Fig. 2.

Freely rotary on the upper end of the shaft 31, and beneath a collar 48, is a ratchet 49 from which extends an arm 51 which is pivoted at 53 to a connecting rod 55 (Fig. 1). The arm 55 is in turn pivoted at 57 to a driving rocker 59. The rocker 59 is on a vertical shaft 61 which passes downward through a bearing 63 (Fig. 3) and receives its motion from a follower 65, cooperating with a cam 67 on the cam shaft 105 (Fig. 4). Thus upon rotation of the cam shaft 105, the ratchet 49 is oscillated. The angle of oscillation is greater than the angle between successive teeth on the ratchet, so that if the pawl 43 is biased toward engagement, it and the disc 41 will be rotated intermittently by successive teeth. If the pawl 43 is disengaged, no motion is transmitted. The follower 65 is held against the cam 67 by a spring 66.

The pawl 43 may be disengaged (so that the ratchet does not drive the pawl) by movement of its tail piece 69 into engagement with a movable lug 71 on a countershaft 73. This occurs when the lug 71 is in an engaging position. If the lug 71 is not in the path of the tail piece 69, the pawl 43 is not drawn out of engagement with the ratchet 49. Such a condition is indicated by the dotted-line position of the lug 71 shown in Fig. 12. The position of the lug 71 for engagement by the tail piece 69 is shown in solid lines in Fig. 12. Thus the ratchet 49 is continuously oscillated but whether or not it drives the shaft 31, and hence plates 19 and 23, depends upon the position of the lug 71 and countershaft 73.

At 75 (Figs. 4 and 5) are shown sprockets which support a conveyor chain C consisting in part of two reaches of block chains 76. The shaft 137 which carries the right-hand sprockets 75 is supported in journals 207 which are adjustable, as indicated, so that desired tension may be maintained in the conveyor chains 76. Certain of the pins of the block chains 76 carry angle plates 77 from which extend hook-shaped wall plates 79. As the plates 77 and 79 pass with chains 76 over the sprockets 75, they are angularly related as shown generally in Fig. 5, that is, separated. When these plates 77 and 79 are positioned on the straight reaches between sprockets, they are rectangularly related as shown. From Figs. 7 and 8 it will also be seen that the upper reaches of the block chains 76 are supported by reason of the fact that the plates 77 (carried by the chains) slide upon guide members 209.

As plates 77 and 79 pass to the upper tangent of the set of sprockets beneath the guides 17, they receive one flat carton 15 through the selective action of the rotary plates 19 and 23. This is before the parts 77 and 79 close in to form a rectangular holder.

Figure 7:
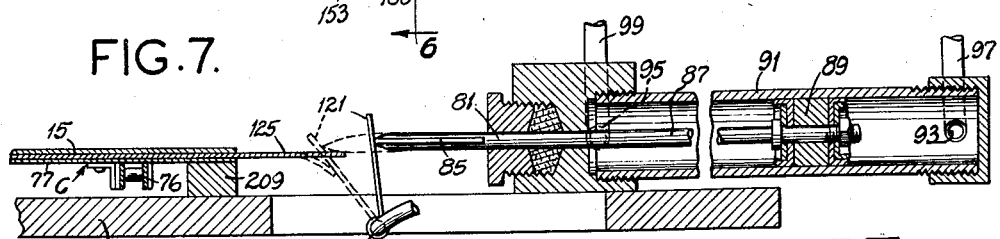
Fig. 7 is a vertical section taken on line 7—7 of Fig. 1.
Figure 8:
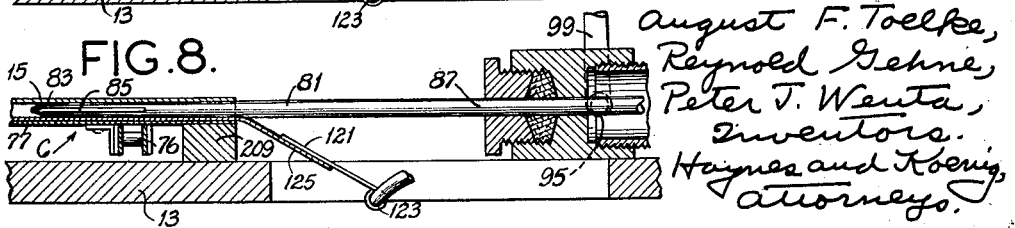
Fig. 8 is a view similar to Fig. 7 showing alternate positions of certain parts.
Figure 13:
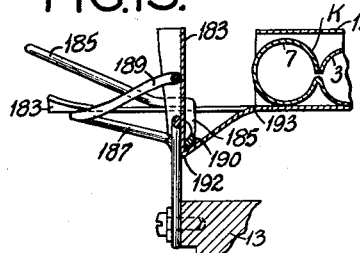
Figs. 13–19 are fragmentary vertical sections taken successively on lines 13—13, 14—14, 15—15, 16—16, 17—17, 18—18, and 19—19 of Fig. 1.

In order to start opening of the successive cartons from their flat conditions as they are dropped into successive angle plates 77 (Fig. 5), an air-operated lance 81 is provided, such as shown in Figs. 1, 5, 7 and 8. This lance 81 has a pointed end 83 with a lateral fin or fluke 85. Behind the fin is a stem 87 which carries a piston 89 in an air cylinder 91. A forward opening stroke is accomplished by introducing air to a rear port 93 (Figs. 7 and 8). Rearward withdrawal action is accomplished by introducing air to a front port 95.

The ports 93 and 95 are connected by suitable hose lines 97 and 99 (respectively) with valve ports 101 and 103 (respectively) of an air valve V. The valve V (Figs. 10 and 11) consists of a body 106 having an air supply manifold 107 in which is a throttle valve 109 for adjustable control of air flow. At 111 is a liner in which is an inlet port 113. A control valve member 115 serves in one position to connect the inlet port 113 with the hose 97 which feeds port 93 to force the lance 81 into a carton. This is when the cam 33 contacts an operating lever 117 (Fig. 11), which is at the time when the lower plate 19 has dropped a carton. Lever 117 is pivoted at 120 and is connected to valve 115 through link 124. Spring 119 biases the valve 115 to return. When the cam 33 further rotates, the lever 117 is released by the cam 33 and air passes from the inlet port 113 to the hose 99 which leads to the port 95 behind piston 89, thus withdrawing the lance 81. Thus for each rotation of the plates 19 and 23, and consequently for each time that a carton 15 is dropped, the lance 81 is reciprocated one forward and backward stroke.

In front of point 83 of the lance 81 is a flap 121 pivoted at 123 and normally biased up by a spring 126 (Fig. 9). This flap is pushed aside by the lance 81 as the lance advances, as shown by the dotted lines in Fig. 7. When pushed aside, it has the effect of depressing a closure flap 125 of the flattened carton to permit entry of the lance. At the time that the closure flap 125 is depressed, the carton is automatically slightly sprung open so that the point 83 of the lance 81 may enter as indicated in Fig. 8. The lance then runs down the entire length of the carton to assure partial opening to a lozenge-shape as indicated in Fig. 5. Then, when the lance is withdrawn, the carton is carried along upon the chain C. The members 77 and 79 become rectangularly related so as to transform the lozenge-shaped cross-section of the carton to a rectangularly-shaped cross-section, as indicated in said Fig. 5. A lip 78 extending from 77 serves as an angle former for one corner of the carton when the straight reach of the chain 76 is reached.

To assure that the parts 77, 78 and 79 are finally properly positioned as the cartons start off in their rectangular movement, a presser foot 127 is employed which reciprocates up and down. This foot is pivoted (Fig. 2) at 129 to an arm 131 which is fastened to an oscillating shaft 133. The timing of the oscillations of the shaft 133 will appear.

The conveyor chain C is driven intermittently to carry off opened cartons from their successive positions beneath the stack 15 successively to a station directly in front of the reciprocating plunger 311. The drive consists of a ratchet wheel 135 (Fig. 2) affixed to a drive shaft 137. This ratchet is between rockers 139 between which is pinned at 141 a pawl 143, normally biased by means of the weight 145 to position for driving the ratchet 135. Pivoted between the rockers 139 at 147 is also a connecting rod 149. At clevis 151 this rod 149 has a pivoted connection 152 to an arm 154, the latter being also carried on said oscillating shaft 133. The upper end of the arm 154 is formed with a catch 153 with which engages a detent latch 155, the latter being normally biased to engaging position, as indicated in Fig. 6. This latch 155 is carried on a shaft 157 which also carries a feeler 159 in position at the adjacent carton end to be contacted by the endmost one of a row of clips K when the carton is filled. In other words, when the feeler 159 is contacted by the endmost one of the clips in a filled box, the latch 155 is rotated out of engagement with the catch 153 so as to release the arm 154. The clockwise motion of arm 154 (Fig. 2) is limited by an adjustable stop 160. At 156 is shown a counterweight which balances out some of the latch weight to make release more sensitive.

Shaft 133 carries an arm 158 from which depends an operating weight 161. Thus, when the catch 153 is released, the arm 154 is biased clockwise (Fig. 2), and forces the rod 149 to the right to operate the arms 139 clockwise and thus also the ratchet 135. This action advances the chain C a distance equal to the distance between successive cartons. This carries a full carton away from its station opposite the ram 311 and brings up an empty carton to this position. At the time that an advance is made, the presser foot 127 is lifted.

Furthermore, at the time that an advance is made, the countershaft 73 is moved to bring the lug 71 into its position clear of the pawl 43 so that the latter may couple to the ratchet 49 for a full revolution of plates 19 and 23. This is accomplished by a connecting rod 163 which is pivoted in the clevis 151 and which is also pivoted at 167 to an arm 169 which is fixed on said shaft 73. Thus, each time that the cartons are advanced, the pawl 43 is released for coupling to the ratchet 49. By the time that a full revolution is accomplished of plates 19 and 23, the lug 71 has returned to the solid-line position for reasons which will appear, and is contacted by the tail 69 to reopen the connection between the ratchet 49 and the pawl 43. Thus is accomplished one revolution of the releasing plates 19 and 23 which thereby drop individual cartons 15 upon the chain C only as required by a previous chain movement.

Return of the catch 153 is effected by returning the weighted linkage which controls it. This is done by means of a cam 171 (Figs. 4 and 6) acting upon a follower 173. The follower 173 is carried on an arm 175 attached to said shaft 133.

The end of the feeler 159 reaches slightly into the end of the carton and is rounded to pass over the adjacent wall of the carton as the latter moves into position. Any movement thus required is not enough, however, to unlatch the catch 153. In fact, the endmost clip moves somewhat from the end of the box to obtain enough motion for release and subsequently is pushed back by the closing-in action of the adjacent carton closure.

Each carton 15 at one end has said flap 125 referred to in connection with Figs. 7 and 8. At the other end is a similar flap 183. These flaps need to be turned up and into the box ends after the box is filled. This may be done by means of a series of wires and guides shown in Figs. 1, 2, 6 and 13-19. Figs. 13-19 show the character of these wires and guides on one side of the apparatus, and similar reference characters in Fig. 1 indicate that the wires and guides are similar on the other side of the apparatus.

Detailing these wires and guides, they consist of a first wire 185, under which passes the respective carton closure 125 or 183 as the case may be. In Figs. 13-19 the end closure is 183.

Figure 14:
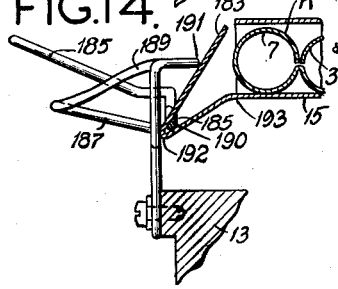
Figure 17:
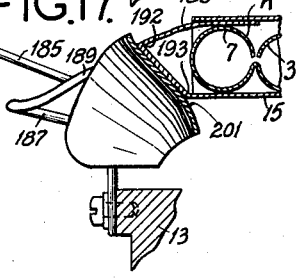
Figure 19:
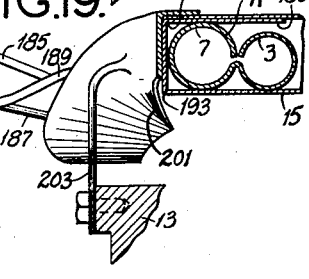
Figure 15:
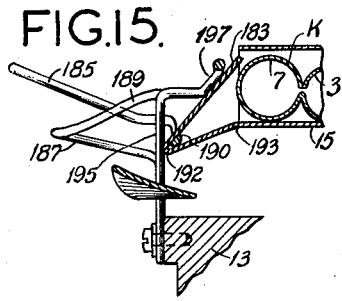

Next comes a wire 187 over which the end of the closure 183 passes. Thus the closure is between the wires 185 and 187. The right-hand end of the wire 187 is inclined as shown at 189 and is formed with a bend 191 over the wire 185, as indicated in Fig. 14. A depressed extension 190 of the wire 185 lies adjacent to a scored part 192 of the flap. Another score is indicated at 193. By means of the above construction, the flap is bent as the box proceeds toward the reader in Fig. 14.

Figure 16:
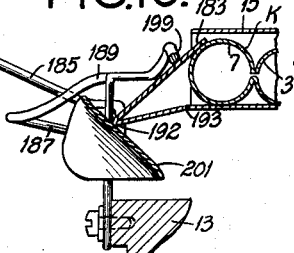
Figure 18:
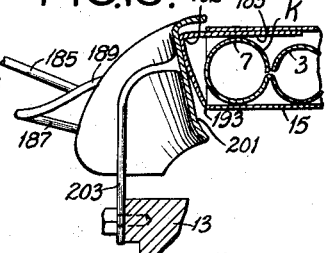

At numeral 195 (Fig. 15) is a third wire which has an angle rest 197 for the bent over flap 183. In the plane of Fig. 16 this rest has a downward extension such as indicated at 199 for further rotating the flap 183 to the right, while at this time the scored part 192 passes from the end of the wire 185 onto a guide surface 201 carried upon a standard 203. This guide surface, as indicated in Figs. 16-19, is so formed that as the box progresses the end of the flap 183 is pushed into the box above the clips therein.

Figures corresponding to Figs. 13-19 have not been inserted to show the guides on the opposite ends of the cartons for the reason above indicated, but they are essentially the same in oppositely directed positions.

One advantage of closing the opposite flaps of the packages at the same time and toward one another, is that no strong gripping means needs to be used in connection with the members 77, 78 and 79 to hold the packages against endwise movement when the closure flaps are closed in. Members 77, 78 and 79 act as jaws to the extent of opening and closing relatively, and some friction hold is applied to the cartons but this is not a crushing grip. The packages are then self-centering with respect to the subsequent end-closing means.

As the cartons approach the end of the conveyor belt C, the members 77, 78 and 79, in passing over the right-hand sprockets open relatively and drop the loaded, closed cartons upon a moving conveyor belt 205 (Fig. 2), which carries them off.

In view of the above, it will be seen that the operation briefly is as follows:

As the pusher 311 reciprocates, clips received from the testing apparatus (not shown herein) are turned counterclockwise and forced, one after another, into the cartons, as indicated in Fig. 6. This continues until the carton is filled, whereupon the feeler 159 is contacted by the endmost clip to raise the latch 155 which releases the catch 153. The bias of the weight 161 then rotates the shaft 133.

Rotation of the shaft 133 has several effects. One is to push the rod 149 to the right, thus rotating the rockers 139, pawl 143, and ratchet 135. The movement is for a predetermined distance, so as to carry the belt C a distance equal to the pitch distance between two successive cartons thereon. This brings an empty carton into position opposite the ram 311 and deposits a filled carton on the belt 205.

At the same time, the rod 163 is drawn over so as to move the shaft 73 counterclockwise as viewed in Fig. 2. This moves the lug 71 from the solid-line to the dotted-line position shown in Fig. 12. Hence the spring 47 biases the pawl 43 against the ratchet 49. Thereafter the oscillations of the arm 51, as determined by the linkage connected therewith and the cam 67 and follower 65, causes one complete revolution of the disc 41 and shaft 31 and a complete revolution of the spaced plates 19 and 23 (Fig. 5). Plate 19 thus releases at the open portion 21 one of the cartons 15 to be deposited upon the belt C. At this time the plate 23 moves in to hold up the supply of cartons until the lower plate 19 again moves into position again to effect said support.

During the revolution of the plates 19 and 23, the cam 33 also revolves to contact the valve lever 117, which sets the valve to deliver air to the port 93 so that the lance 81 is operated to be inserted through the deposited carton, so as to open it into lozenge-shape, as indicated in Fig. 5. This is before the plates 77 and 79 and the belt C close up into the rectangular relationship. As the cam 33 leaves the lever 117, the valve V is reset so that air is delivered to the port 95, thus withdrawing lance 81.

When the arm 154 is released to clockwise position in Fig. 4, the presser foot 127 is raised. This admits advance of the edge 78 of the angle plate 77, even though that edge is slightly raised, as would be the case in view of the resistance of the carton of being forced into its rectangular shape from its lozenge-shape.

Finally, the cam 171 operating upon the follower 173 moves the shaft 133 counterclockwise, thus lifting the weight 161 against its bias and returning the catch 153 behind the latch 155. This returns the lever 131 and depresses the presser foot 127 to force down the edge 78 so that the members 77, 78 and 79 force the carton into true rectangular form for properly receiving the clips when the station opposite the ram 311 is approached. Lug 71 is only effective upon full revolution of plates 19 and 23.

As filled cartons move from the filling stations opposite the ram 311, the ends 183 and 125 are folded over and turned in as they pass through the wires 185, 187 and 195 and past the former 201. Finally, as the closed packages leave the closing apparatus, the plates 77 and 79 open to deposit the loaded closed packages upon the belt 205.

Figure 20:
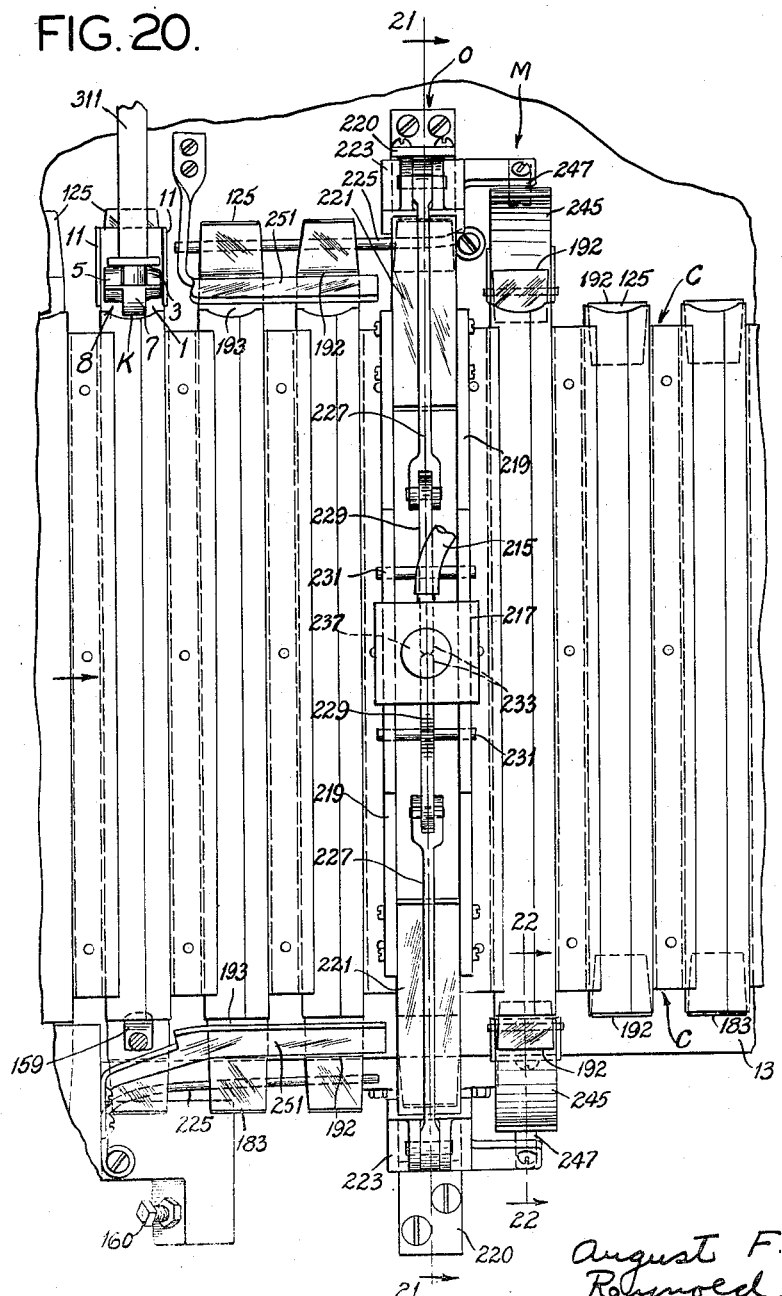
Fig. 20 is a fragmentary plan view of a modification.

In Figs. 20-22 is shown an alternative scheme for closing in the ends of the packages. This operates more positively than the wire guides above described. Like numerals designate like parts.

In this case the valve V is arranged with the outlet hose 97 connected to a second manifold 211 having a control valve 213. The control valve is for control of flow in the hose 97 which leads to the port 93 in the lance cylinder 91, since this is to be differentiated from flow in a line 215 which passes to a cylinder 217. Cylinder 217 is mounted over the conveyor belt C at a plane O to the right of the filling station opposite ram 311. This cylinder 217 is supported upon a bridge 219. The bridge 219 is connected sidewise to guides 221 upon which are sliders 223. Brackets 220 support the guides 221. The sliders also function as tuckers for the opposite flaps 125. These flaps are initially carried upon supporting guide wires 225 and bent down by plates 251. The outer edges of the flaps 183, when in the dotted-line position (Fig. 21), lie within the outermost positions of the tuckers 223.

The tuckers are controlled in their positions on the guides 221 by means of linkages consisting of connecting rods 227 pivoted to bell cranks 229, said cranks being pivoted at 231 to said bridge 219. The control arms 233 of the bell crank are joined with an extension 235 of a piston 237 which works in the cylinder 217. The piston has a tail rod 239 with a collar 241 pressed by a spring 243, for normally biasing the piston up, which biases the linkages into the dotted-line position shown. In this position the tuckers 223 are outward so that the carton covers 183 may move into position between them.

When a loaded carton comes into position, such as shown in Figs. 20 and 21, beneath the bridge 219, it rests. During a rest period (which is also when a succeeding carton is being loaded and another succeeding flat carton is being dropped on belt C), the cam 33 operates the valve lever 117 of valve V so that the valve V transmits air not only to the port 93 to operate the lance 81, but also through hose 215, to depress the piston 237. This causes the linkages in Fig. 21 to be moved from the dotted-line to the solid-line positions, whereupon the tuckers 223 move inward and upward to tuck in the ends of the flaps 183 as indicated by the solid-line positions of said flaps.

The tuckers then return, leaving the flaps in the solid-line partially-closed positions. As the machine proceeds through its cycle of operation, the carton is moved to a position indicated at M in Fig. 20 where are located opposite swinging flaps 245 which may swing from the dotted-line position shown in Fig. 22 to the solid-line position (Fig. 22). These flaps in dotted-line positions normally rest against lateral extensions 247 from the tuckers 223. Hence when the tuckers operate upon a succeeding package, the partially closed package at the station M is completely closed by the action of the extensions 247 pushing in the flaps 245 to close in the carton flaps 183, as indicated by the solid lines in Fig. 2. The return spring 249 returns the flaps 245 to initial position.

In this form of closure, the guide plates 251 are also used to confine the clips within the cartons as the cartons move to closing positions, besides causing the flaps 183 to be angled downward at the score lines 192.

An important feature of the invention in general is that all advancing operations depend upon the feeler 159, that is, upon the fact that a carton at the filling station is full enough to operate the feeler. Thus, should the testing apparatus fail to deliver one or more clips ahead of the reciprocating member 311, it would require more time for ultimate filling of a carton, but the operation of the various parts of the loader would then be held in abeyance until filling is completed, as determined by contact of the first clip inserted into the carton with the feeler 159. This also applies to the operation of the one-revolution clutch shown in Fig. 12, because this remains declutched as long as the lug 71 is in the solid-line position, which corresponds to the condition of the latch 155 wherein it holds the catch 152.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A package loader comprising means for laterally advancing to a filling station an elongate package which is open at both ends, means for pushing articles into one open end of the package and through the same toward the other open end while at the filling station, biased means for holding the package at the filling station while being filled, detent means for preventing said movement of the biased means, and means responsive to an article tending to emerge from the last-named open end of the package when the package is filled for releasing the detent means, whereby said biasing means moves the package laterally away from the filling station.

2. Package loading apparatus comprising a filling station, a supply for flattened elongate packages, a conveyor belt, sprocket means beneath said supply for supporting the conveyor belt, jaw means on the belt openable to receive a package while the belt is passing over the sprocket, the jaw means automatically closing around the package upon leaving the sprocket, means biasing the belt to move a package laterally of its length from the supply along a straight line to the filling station, a latch resisting said bias, means responsive to a filled condition of a package adjacent the filling station for releasing said biasing means to advance the package further along a straight line, automatic means for returning said biasing means to latch position, and means released by the biasing action to release one package from the supply to the conveyor.

3. Loading apparatus comprising a filling station, a supply for flattened elongate cartons, a conveyor belt, sprocket means beneath said supply for supporting the conveyor belt, means for intermittently moving the belt, jaw means on the belt openable to receive a flattened carton while passing over the sprocket, means supplying said flattened cartons one-by-one according to said intermittent movement, means for partially opening cartons on the belt, said jaw means automatically closing upon leaving the sprocket and completely opening the cartons, power means biasing the belt to move a package in a direction lateral to its length along a straight line and to the filling station, a latch resisting said bias, means responsive to a filled condition of a package adjacent the filling station for releasing said biasing means to advance a package further along said straight line, and means for returning said biasing means to latch position.

4. Loading apparatus comprising a filling station, a supply for flattened packages, a conveyor belt, sprocket means beneath said supply for supporting the conveyor belt, package containing means on the belt openable to receive a package while passing over the sprocket and automatically closing upon a package when leaving the sprocket, power means biasing the belt to move a package to the filling station, a latch resisting said bias, means responsive to a filled condition of a package adjacent the filling station for releasing said biasing means to advance the package a predetermined distance, automatic means for returning said biasing means to latch position, means released by the biasing action to release one carton from the supply to the conveyor, a lance operative to partially open a package after release, and lance-operating means responsive to the action of said package-operating means.

5. Package loading apparatus comprising a filling station, a supply for flattened packages, a conveyor belt, sprocket means beneath said supply for supporting the conveyor belt, package containing means on the belt openable to receive a package while passing over the sprocket and automatically closing upon leaving the sprocket, power means biasing the belt to move a package from the supply to the filling station, a latch resisting said bias, means responsive to a filled condition of a package adjacent the filling station for releasing said biasing means to advance the package, automatic means for returning said biasing means to latch position, means released by the biasing action to release one carton from the supply to the conveyor, a lance operative to partially open a package after release, lance-operating means responsive to the action of said package-operating means for actuating the lance, means carried upon the conveyor for completely opening the partially opened package as it moves from its position adjacent the package supply toward said station, and means responsive to the return action of said biasing means for enforcing the proper positioning of the means on the conveyor for determining the final package shape prior to advance to said filling station.

6. In package loading apparatus, means supporting elongate packages open at both ends, means for biasing the supporting means to advance the packages laterally along a straight line toward a filling station, latch means at one end of advanced packages resisting the bias, means for pushing articles into the package from one open end and toward the other end while at the filling station, means at said other open end responsive to article movement when the package is filled to release said latch whereby said bias moves the loaded package away from said station along a continuation of said straight line.

7. In package loading apparatus, means supporting elongate packages open at both ends, means for biasing the supporting means to advance the packages laterally along a straight line toward a filling station, latch means at one end of advanced packages resisting the bias, means for pushing articles into the package from one open end and toward the other end while at the filling station, means at said other open end responsive to article movement when the package is filled to release said latch whereby said bias moves the loaded package away from said station along a continuation of said straight line, and means for automatically closing the loaded packages by simultaneous oppositely directed operations on the opposite open ends as they intermittently move from the filling station.

8. In package loading apparatus, means supporting an elongate package open at both opposite ends, means for biasing the supporting means to advance the package laterally along a straight line toward a filling station, latch means resisting the bias, means for pushing articles into the package from one open end toward the other end while at the filling station, means at said other open end responsive to an article when the package is filled to release said latch whereby said bias moves the loaded package laterally away from said station and continuing along said straight line, said package having closure flaps adjacent the open ends, and means beyond the filling station cooperating simultaneously with the opposite flaps by simultaneously oppositely directed operations thereon thereby closing the flaps while at the same time balancing the longitudinal forces on the package.

9. In package loading apparatus, means supporting elongate packages open at both ends, means for advancing the packages laterally toward a filling station, means for pushing articles into the package from one open end and toward the other end while at the filling station, means at said other open end responsive to an article when the package is filled to move the loaded package away from said station, said package having closure flaps adjacent the opposite open ends, and means beyond the filling station simultaneously cooperating with the opposite flaps at opposite ends of the package for closing the flaps by simultaneously oppositely directed operations thereon.

10. Carton loading apparatus comprising conveyor chains over sprockets, angle plates attached to said chains and lying parallel at the straight reaches of the chains but being angled respectively when passing over the sprockets, each plate providing a bottom upon which a carton may rest on one side, and an extension from each plate cooperating with a portion of the preceding plate to form another side, said plates being adapted when passing from the sprockets to the straight reaches of the chains to receive a carton in lozenge shape of cross section and to force said lozenge shape into a rectangular shape as the support proceeds, means extending over the carton at one corner, and automatic means for depressing said extension positively to determine more or less accurate rectangular shaping as the cartons leave positions near the sprockets.

11. Means for closing elongated packages which are open at both ends and have open flaps at said openings, comprising oppositely reciprocating tuckers, means for moving the packages between the points of reciprocation, said tuckers partially introducing the flaps into the package upon a first motion toward one another, means for subsequently moving the package sidewise to an adjacent point, and extensions from said tuckers adapted while the package is at the last-named point to push the flaps into ultimate positions in the package upon a subsequent stroke of said tuckers.

12. Loading apparatus comprising a carton supply means, a carton advancing means, a filling station, said advancing means intermittently advancing cartons step by step from the supply location to the filling station, biased operating means for said advancing means, automatic return means therefor, a latch for blocking action of the operating means, a feeler responsive to the position of an article in the package when filled at the filling station adapted to release said biasing means to move the carton advancing means one step, means for delivering articles from the supply one by one to said advancing means, a continuous drive means for said article delivery means, a one-revolution clutch between said continuous drive means and said article delivery means, and means for closing the clutch in response to said release by said latch release, said article delivery means becoming operative to deposit a carton on the advancing means only when said advancing means is stationary.

13. A package loader comprising means for laterally advancing to a filling station a package which is open at both ends, means for pushing articles into one open end of the package and through the same toward the other open end while at the filling station, the advancing means holding the package at the filling station while being filled, and means responsive to an article tending to emerge from the last-named open end of the package when the package is filled for operating the advancing means to move the package laterally away from the filling station.

AUGUST F. TOELKE.
REYNOLD GEHNE.
PETER J. WENTA.